United States Patent [19]
Kvasnikoff et al.

[11] Patent Number: 5,508,013
[45] Date of Patent: Apr. 16, 1996

[54] PROCESS FOR THE PRODUCTION OF SULPHUR FROM AT LEAST ONE SOUR GAS CONTAINING HYDROGEN SULPHIDE AND A FUEL EFFLUENT AND THERMAL REACTOR

[75] Inventors: Georges Kvasnikoff, Monein; Jean Nougayrede, Pau; Andre Philippe, Orthez, all of France

[73] Assignee: Elf Aquitaine Production, Courbevoie, France

[21] Appl. No.: 294,192

[22] Filed: Aug. 22, 1994

Related U.S. Application Data

[63] Continuation of Ser. No. 958,114, Jan. 29, 1993, abandoned.

[30] Foreign Application Priority Data

Apr. 25, 1991 [FR] France ................. 91 05102

[51] Int. Cl.$^6$ ............. B01D 53/50; B01D 53/52; B01D 53/75
[52] U.S. Cl. ............. 423/220; 423/222; 423/224; 423/230; 423/244.05; 423/245.3; 423/567.1; 423/573.1; 423/574.1; 423/576.8
[58] Field of Search ............. 110/188; 422/110, 422/182, 189; 423/220, 222, 224, 226, 230, 244.05, 245.3, 576.8, DIG. 5, 567.1, 573.1, 574.1

[56] References Cited

U.S. PATENT DOCUMENTS

| | | | |
|---|---|---|---|
| 3,424,560 | 1/1969 | Carmassi et al. | 423/567.1 |
| 3,447,903 | 6/1969 | Wiewiorowski | 423/567.1 |
| 3,617,221 | 11/1971 | Egan et al. | 23/225 P |
| 3,822,337 | 7/1974 | Wunderlich et al. | 423/224 |
| 3,851,050 | 11/1974 | Groenendaal et al. | 423/222 |
| 3,970,743 | 7/1976 | Beavon | 423/574 R |
| 4,035,158 | 7/1977 | Scott et al. | 23/278 |
| 4,038,036 | 7/1977 | Beavon | 23/262 |
| 4,069,020 | 1/1978 | Bond et al. | 23/262 |
| 4,100,266 | 7/1978 | Smith | 423/574 R |
| 4,394,119 | 7/1983 | Waller et al. | 431/5 |

FOREIGN PATENT DOCUMENTS

| | | | |
|---|---|---|---|
| 274809 | 1/1990 | Germany | 423/576.8 |
| 53-140277 | 12/1978 | Japan | 110/188 |

OTHER PUBLICATIONS

"Gas Purification" by Riesenfeld et al., 2nd Edition, Gulf Publishing Co, Houston TX, 1974 pp. 370–383.

*Primary Examiner*—Gary P. Straub
*Assistant Examiner*—Timothy C. Vanoy
*Attorney, Agent, or Firm*—Burgess, Ryan and Wayne

[57] ABSTRACT

A process is provided for the production of sulphur from at least one sour gas containing $H_2S$ and a gaseous or liquid fuel effluent, of the type comprising a thermal reaction step, wherein the thermal reaction step is conducted by performing the combustion of the gaseous or liquid fuel effluent in a first zone of the thermal reaction stage with a quantity of a gas containing free oxygen in excess in relation to the theoretical quantity needed for a complete combustion of the fuel effluent, the excess being smaller than the theoretical proportion of gas containing free oxygen needed to oxidize to $SO_2$ approximately one third of the $H_2S$ of the total flow of sour gas into the combustion fumes of the fuel effluent which are present in the first zone of the thermal reaction stage, by burning incompletely a second stream of sour gas in a second zone of the thermal reaction stage, which receives the gaseous products from the first zone, with a controlled quantity of gas containing free oxygen, such that the $H_2S:SO_2$ molar ratio in the gases originating from the catalytic reaction step has a predetermined value, and by adjusting the flow rates of the first and second sour gas streams so that the temperature obtained during the incomplete combustion of the second sour gas stream in the second zone of the thermal reaction stage has a value higher than 850° C.

12 Claims, 2 Drawing Sheets

PROCESS FOR THE PRODUCTION OF SULPHUR FROM AT LEAST ONE SOUR GAS CONTAINING HYDROGEN SULPHIDE AND A FUEL EFFLUENT AND THERMAL REACTOR

This application is a continuation of application Ser. No. 07/958,114, filed Jan. 29, 1993, abandoned.

BACKGROUND OF THE INVENTION

1. Field of the Invention

The invention relates to a process for the production of sulphur from at least one sour gas containing $H_2S$ and a gaseous or liquid fuel effluent. It further relates to a thermal reactor which can be employed in implementing the said process.

2. Background Art

The preparation of sulphur from a sour gas containing hydrogen sulphide by the Claus process consists in a controlled oxidation of the hydrogen sulphide by the oxygen of a gas containing free oxygen, the said oxidation being prolonged in contact with a catalyst. The sour gas containing hydrogen sulphide is brought into a thermal reaction stage in which approximately a third of the hydrogen sulphide is converted into $SO_2$ by controlled combustion in the presence of a gas containing free oxygen and a certain quantity of sulphur is formed. The gaseous reaction mixture/originating from the thermal reaction stage is then subjected to indirect cooling making it possible to recover the heat energy which it contains by producing steam, and the said cooled mixture is directed towards a condensation stage in which the sulphur present in the gaseous mixture is separated by condensation. To drive further the sulphur production, which at this stage is still very incomplete, the gaseous mixture originating from the condensation stage is reheated and then brought to a catalytic reaction stage containing a suitable catalyst in contact with which the $SO_2$ and $H_2S$ present in the said mixture react with each other to form a new quantity of sulphur. The catalytic conversion generally requires two or three catalytic zones, each of which is preceded by a heater for the gas mixture to be treated and followed by a condenser in which the sulphur formed separates out. The residual gases originating from the final catalytic zone, which still contain small quantities of sulphur compounds such as $H_2S$, $SO_2$, sulphur vapour and/or vesicular sulphur, COS and $CS_2$ optionally flow into a purification stage, which still retains a high proportion of the sulphur compounds present in the said residual gases, before being directed towards an incineration stage to be then discharged into the atmosphere.

In some cases it may be necessary in the thermal reaction stage to perform the combustion of a gaseous fuel effluent so that it accompanies the controlled oxidation of $H_2S$. Thus, when a fuel effluent is available which consists of a residual gas or of a liquid containing sulphur compounds, especially organic sulphur compounds and possibly ammonia or ammonia-forming compounds, the abovementioned combustion makes it possible to destroy the sulphur and nitrogen compounds in the fuel effluent and to form $SO_2$ from the said sulphur compounds, this $SO_2$ being added to the $SO_2$ produced by the controlled oxidation of $H_2S$ in the sour gas. Another example of a combustion of the abovementioned kind is encountered in the treatment of an $H_2S$-lean sour gas in the thermal reaction stage, the fuel effluents then consisting of a heating gas whose combustion allows the temperature in the thermal reaction stage to be raised to the required value, which cannot be obtained merely by the controlled oxidation of the $H_2S$-lean sour gas.

The known processes for simultaneously producing, on the one hand, the combustion of a gaseous or liquid fuel effluent and, on the other hand, the controlled oxidation of $H_2S$ in a sour gas while operating in the thermal reaction stage of a Claus sulphur production plant do not make it possible to carry out this treatment over a wide range of flow rates and compositions while completely satisfying the requirements linked with obtaining, at the exit of the thermal reaction stage, a reaction gas stream of the quality needed for a subsequent treatment in the catalytic stage of the Claus plant, that is to say with obtaining a gas stream containing $H_2S$, $SO_2$ and sulphur vapour and virtually free from $NH_3$, $SO_3$, hydrocarbon and nitrogen oxide impurities.

The subject of the invention is a process which makes it possible simultaneously to carry out the total combustion of a gaseous or liquid effluent and the controlled oxidation of the $H_2S$ in at least one sour gas in the thermal reaction stage of a Claus sulphur production process, under conditions such as to produce, at the exit of the said thermal reaction stage, a reaction gas stream containing $H_2S$, $SO_2$ and sulphur vapour and containing virtually none of the impurities referred to above, over an extensive range of flow rates and compositions.

SUMMARY OF THE INVENTION

The process according to the invention is therefore a process for the production of sulphur from at least one sour gas containing $H_2S$ and a gaseous or liquid fuel effluent, of the type comprising a thermal reaction step, carried out in a thermal reaction stage and consisting in carrying out a controlled oxidation of the $H_2S$ in the sour gas and a complete combustion of the fuel effluent to produce a gas stream containing $H_2S$, $SO_2$ and sulphur vapour, then a step of indirect cooling of the said gas stream to separate the sulphur therefrom by condensation and next a catalytic reaction step carried out on the gas stream originating from the cooling step, and which is characterised in that the thermal reaction step is conducted by performing the combustion of the gaseous or liquid fuel effluent in a first zone of the thermal reaction stage with a quantity of a gas containing free oxygen in excess in relation to the theoretical quantity needed for a complete combustion of the fuel effluent, the said excess being smaller than the theoretical proportion of gas containing free oxygen needed to oxidise to $SO_2$ approximately one third of the $H_2S$ of the overall flow rate of sour gas to be treated, by injecting a first stream of sour gas into the combustion fumes of the fuel effluent which are present in the said first zone of the thermal reaction stage, by burning incompletely a second stream of sour gas in a second zone of the thermal reaction stage, which receives the gaseous products from the first zone, with a controlled quantity of gas containing free oxygen, such that the $H_2S:SO_2$ molar ratio in the gases originating from the catalytic reaction step has a predetermined value, the said value being in particular equal to approximately 2:1, and by adjusting the flow rates of the first and second sour gas streams so that the temperature obtained during the incomplete combustion of the second sour gas stream in the second zone of the thermal reaction stage is higher than 850° C. and more particularly higher than 920° C.

DESCRIPTION OF THE PREFERRED EMBODIMENTS

In the process according to the invention the fuel effluent is burned entirely in the presence of an excess of gas containing free oxygen. In addition, the fact of injecting, in the form of the first sour gas stream, a fraction of the total flow of sour gas to be treated in the oxidising fumes from the said combustion in the first zone of-the thermal reaction stage makes it possible, at the burner performing the combustion of the second sour gas stream in the second zone of the thermal reaction stage, to have a sufficient temperature (higher than 850° C. and more particularly higher than 920° C.) to ensure flame stability while enabling the desired $H_2S:SO_2$ molar ratio to be obtained at the exit of the catalytic reaction stage. In addition to the advantages referred to above, the process according to the invention makes it possible, when compared with known processes, to treat larger flows of liquid or gaseous fuel effluents at a given overall sour gas flow rate.

In an advantageous form of implementation of the process according to the invention the gas stream originating from the second zone of the thermal reaction stage passes through a gas residence zone in which the said gas stream is maintained at a temperature equal or close to its exit temperature from the said second zone, before being brought to the cooling step preceding the catalytic reaction step.

The residence time of the gases in each of the zones of the thermal reaction stage, including that in the gas residence zone when this is present, may vary quite widely and may be quite different or, on the other hand, substantially equal from one zone to another. Satisfactory values for each of the said residence times are, in particular, those between 0.2 and 2 seconds.

The first stream and/or second stream of sour gas, which are treated by the process according to the invention, may contain hydrocarbons in an overall concentration of between 0.2 and 10% and more particularly between 0.5 and 5% by volume.

The first and second sour gas streams employed in the process of the invention may consist of two different sour gases which have identical or different $H_2S$ contents. The $H_2S$ content of the sour gas constituting the first sour gas stream is advantageously lower than that of the sour gas forming the second sour gas stream. The first and second sour gas streams may also consist, respectively, of a first fraction of a single sour gas and of the remaining fraction of this sour gas.

In an embodiment of the process according to the invention the fuel effluent is a gaseous or liquid residual effluent which contains sulphur compounds capable of being oxidised to $SO_2$, especially organic sulphur compounds such as organic sulphides and, for example, alkyl disulphides such as dimethyl disulphide and diethyl disulphide, and possibly ammonia or nitrogen compounds such as HCN, while at least the second sour gas stream has an $H_2S$ content higher than 15% by volume, the flow rate of the fuel effluent and the overall flow rate of the first and second sour gas streams being such that the molar flow rate X of the $SO_2$ formed during the combustion of the fuel effluent is lower than half of the total molar flow rate Y of the $H_2S$ contributed by the said sour gas streams, whereas the excess of gas containing free oxygen corresponds to a molar oxygen flow rate lower than $(Y-2X)/2$, in relation to the theoretical quantity needed for a complete combustion of the fuel effluent.

In another embodiment of the process according to the invention the fuel effluent consists of a heating gas, while the first and second sour gas streams have an $H_2S$ content lower than 35% by volume.

If need be, the reactants, namely the fuel effluent, sour gas and air, which are brought to the thermal reaction stage may be preheated to a temperature which can range up to approximately 500° C. before being injected into the said stage.

The gas containing free oxygen employed for the combustion of the fuel effluent and for the incomplete combustion of the second fraction of the sour gas is generally air, although it is possible to employ pure oxygen, oxygen-enriched air or else mixtures in various proportions of oxygen and of one or more inert gases other than nitrogen.

The preheating of the reactants and/or the use of oxygen-enriched air or even of pure oxygen make it possible, in particular, to treat sour gases which are particularly lean in $H_2S$, by raising the temperature of combustion of these sour gases in the second zone of the thermal reaction stage.

The invention relates further to a thermal reactor which can be employed to constitute the thermal reaction stage in which the thermal reaction step of the process according to the invention is carried out.

The said thermal reactor is of the type comprising a first chamber made of refractory material, with a closed end provided with a burner, for example an axial, radial or tangential burner, which has means for the delivery of a gaseous or liquid fuel effluent and for the delivery, at an adjustable flow rate, of a gas containing free oxygen, and an end provided with an opening forming an exit, and a second chamber made of refractory material, situated downstream of the first chamber, the said second chamber having an entry opening which communicates with the exit of the first chamber, and an opening forming an exit, this second chamber being additionally provided with a burner, for example a radial or tangential burner, which has means for the delivery of a second sour gas stream and means for the delivery, at an adjustable flow rate, of gas containing free oxygen, and is characterised in that it comprises, on the one hand, means for injecting, for example radially or tangentially injecting, a first sour gas stream into the first chamber and, on the other hand, means for regulating flow rates, arranged to control the ratio of the flow rates of the said first and second sour gas streams by affecting the flow rate of either of these streams.

The means for injecting the first sour gas stream into the first chamber of the thermal reactor may be connected to the means for the delivery of the second sour gas stream into the second chamber of the said reactor, so that the said first sour gas stream constitutes a first fraction of a single sour gas, while the said second sour gas stream forms the remaining fraction of the single sour gas.

In an advantageous embodiment the first chamber of the thermal reactor is divided into two parts by a cellular wall made of refractory material perpendicular to the lengthwise axis of the said chamber and arranged between the burner and the means for injecting the first sour gas stream with which this chamber is equipped.

The thermal reactor may also comprise a third chamber made of refractory material, this third chamber having an entry opening which communicates with the exit of the second chamber by means of a cellular partition made of refractory material, and an opening forming the exit of the thermal reactor.

The different chambers of the thermal reactor may all be arranged within the same single metal vessel.

The exit of the second chamber, in the case of a thermal reactor with two chambers, or the exit of the third chamber when the thermal reactor has three chambers, forms the exit of the thermal reactor. In a plant employing a Claus sulphur manufacture process this exit is generally in communication with the entry of a heat recovery boiler producing steam by indirect heat exchange between a water circuit and the hot gases originating from the thermal reactor.

BRIEF DESCRIPTION OF THE DRAWINGS

Other characteristics and advantages of the invention will appear on reading the description below of an embodiment of the said invention, given by way of illustration and without any limitation being implied, with reference to the attached drawing in which.

Figure 1:
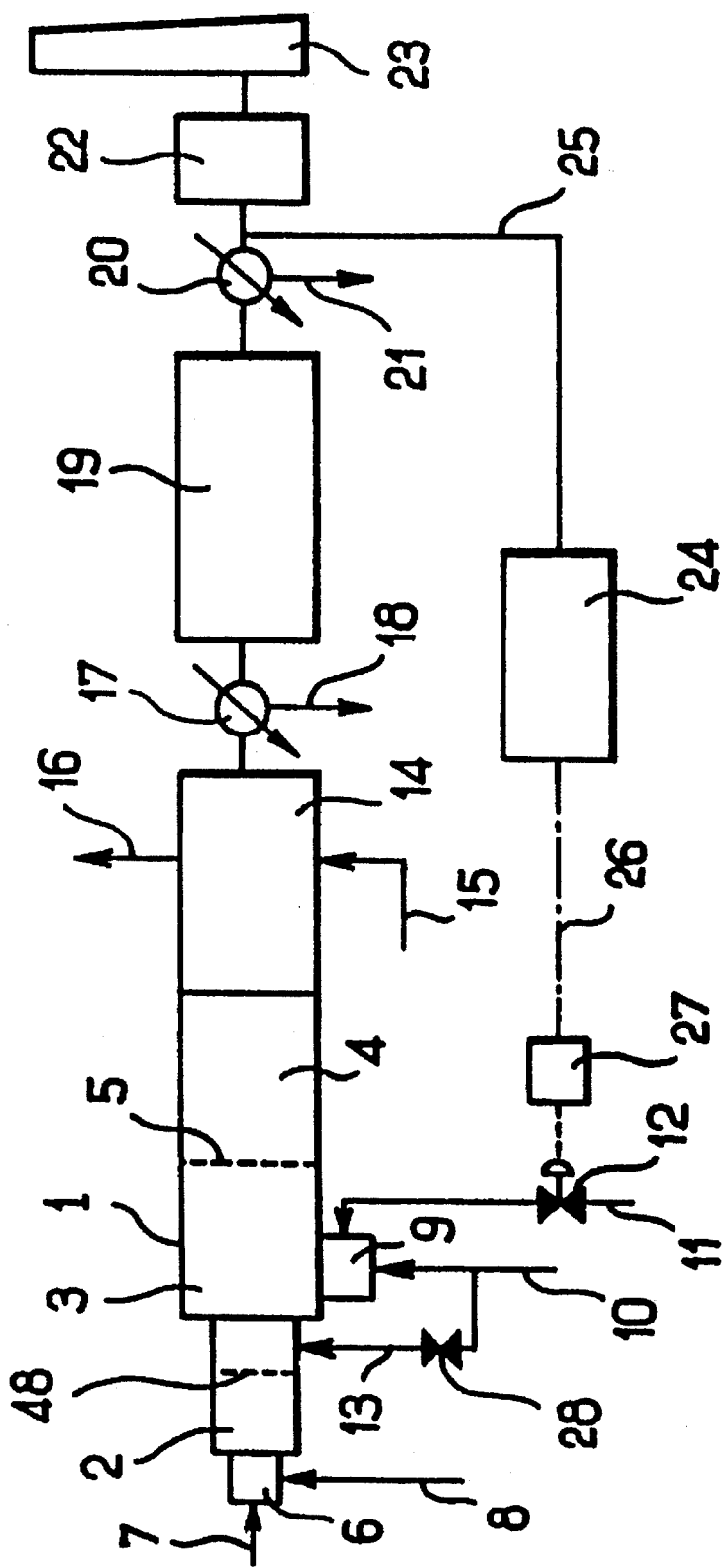
FIG. 1 is a basic diagram of a plant for implementing the process according to the invention.

The plant shown in FIG. 1 comprises a thermal reactor 1 comprising a first thermal reaction chamber 2, a second thermal reaction chamber 3 and a high temperature residence chamber 4, the said chambers being substantially cylindrical and coaxial or otherwise. These chambers, made of refractory material, are arranged in series in the above-mentioned order and each communicates with the following one, the first two by an orifice which is not shown and the last two by means of a cellular partition 5 made of refractory material. The first thermal reaction chamber is equipped with an axial burner 6 provided with a conduit 7 for the delivery of a liquid or gaseous fuel effluent and with a conduit 8 for the delivery of a gas containing free oxygen. A transverse cellular wall 48 made of refractory material divides the first chamber into two parts. The second thermal reaction chamber is equipped with a radial burner 9 opening into the said chamber in the vicinity of the end of this chamber close to the first chamber, the said burner having a conduit 10 for the delivery of a sour gas and a conduit 11 for the delivery of gas containing free oxygen, this latter conduit being equipped with a valve 12 with an opening which can be controlled by the action of a servo mechanism 27. A conduit 13 equipped with an adjustable-opening valve 28 is mounted as a branch on the conduit 10 and opens into the first chamber 2 of the thermal reactor downstream of the cellular wall 48 to deliver into the said chamber a fraction of the single sour gas flowing in the conduit 10, the said fraction of sour gas constituting a first sour gas stream, while the remaining fraction arriving at the burner 9 forms a second sour gas stream.

The exit of the thermal reactor, that is to say the exit of the chamber 4 of the said reactor, is connected to a heat recovery boiler 14 operating by indirect heat exchange and producing steam from the water introduced through a conduit 15, the steam produced being removed by a conduit 16. A condenser 17 for separating the sulphur is arranged at the exit of the heat recovery boiler, the said condenser being provided with a conduit 18 for removing the liquid sulphur. The exit of the condenser 17 is connected to the entry of a catalytic reaction stage 19. The latter usually comprises two or three catalytic converters mounted in series, each of them being preceded by a heater for the gas mixture to be treated and being followed by a condenser for separating the sulphur. The condenser following the last catalytic converter has been shown at 20, the said condenser having a conduit 21 for removing the liquid sulphur. An incinerator 22, which is connected to a stack 23 is placed following this condenser. Where appropriate, an additional purification stage of any known type may be inserted between the condenser 20 and the incinerator 22. Means of control 24, of the type of those known in the art for negative feedback control, are employed to perform the analysis of samples of the residual gases leaving the catalytic reaction stage 19 and cooled in the condenser 20, to determine their $H_2S$ and $SO_2$ contents, the said samples being taken via a sampling line 25, and, from the results of this analysis, producing a command signal 26 of the servo mechanism 27 which controls the opening of the valve 12 to adjust the flow rate of gas containing free oxygen delivered to the burner 9 by the conduit 11 so as to maintain the $H_2S$:$SO_2$ molar ratio in the gases leaving the catalytic reaction stage 19 at the chosen value, which is generally equal to 2:1. The degree of opening of the valve 28 fitted in the conduit 13, which determines the flow rate of sour gas in the said conduit 13, and consequently the ratio of the flow rates of the sour gas fractions originating from the sour gas stream delivered by the conduit 10 and which are injected into the chamber 2 and into the burner 9 respectively, is adjusted by a proportional metering device, not shown. The adjustment of the degree of opening of the valve 28 could also be carried out by a negative feedback control process tending to maintain the flame temperature of the burner 9 at the desired value.

Figure 2A:
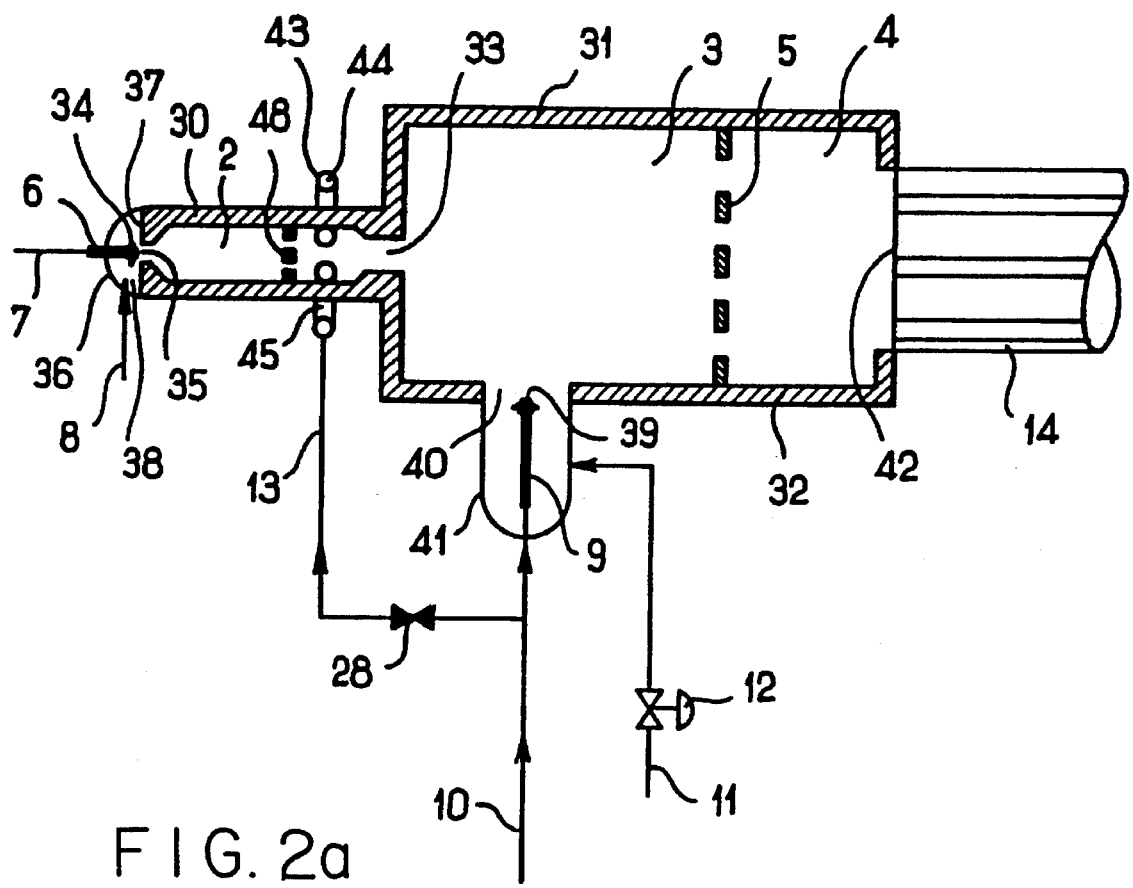
FIG. 2a shows diagrammatically a lengthwise section of a thermal reactor employed in the plant of FIG. 1, the said section being along a plane passing through the axis of the reactor.
Figure 2B:
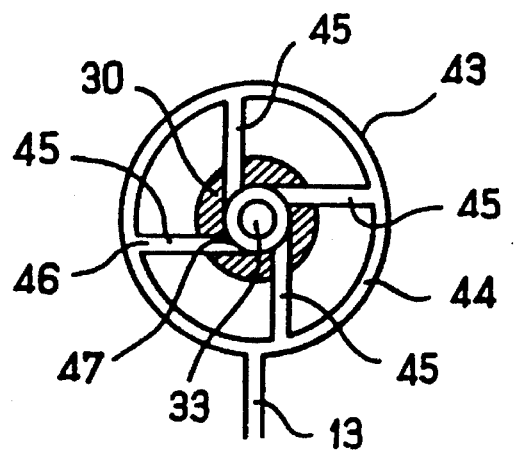
FIG. 2b is a diagrammatic cross-section of the thermal reactor of FIG. 2a, the said section being along a plane perpendicular to the axis of the reactor and passing through the means for injecting sour gas into the first chamber of the said reactor.

The thermal reactor shown diagrammatically in lengthwise section and in cross-section in FIGS. 2a and 2b respectively, corresponds, with some additional details, to the thermal reactor 1 shown diagrammatically in FIG. 1, the corresponding parts being given the same references. The thermal reaction first chamber 2 and the second chamber 3 and the high temperature residence chamber 4 can again be seen joined in series, the said chambers being bounded by refractory walls, 30 in the case of the chamber 2, 31 in the case of the chamber 3 and 32 in the case of the chamber 4, respectively. Chambers 2 and 3 communicate by an orifice 33, while chambers 3 and 4 communicate by a cellular partition 5. At the end of the thermal reaction chamber 2 which is that furthest away from the thermal reaction chamber 3 an axial burner 6 is arranged, comprising a burner head 34 and connected to the conduit 7 for the delivery of the gaseous or liquid fuel effluent, the said burner opening into the chamber 2 by an orifice 35 made in the refractory wall of the said chamber 2. A casing 36 surrounds the burner 6 and defines, with the end 37 of chamber 2, a space 38 into which opens the conduit 8 for delivering the gas containing free oxygen. A transverse cellular wall 48 divides the chamber 2 into two parts. A radial burner 9 is fitted into the wall 31 of the chamber 3 so that the head 39 of this burner, which is connected to the sour gas delivery conduit 10, opens into a channel which is connected to the acid-gas supply line 10, discharges in a channel 40 made in said wall 31 and opens In the thermal-reaction chamber 3 following a radial direction. The burner 9 is surrounded by a casing 41 in which discharges the pipe 11 for conveying gas containing free oxygen provided with the valve 12 having an adjustable opening.

The open end 42 of the thermal reactor, which is at the same time the exit of the chamber 4 containing the gas of elevated temperature, is connected to the boiler 14 for thermal recovery of the CLAUS installation, said boiler being joined to the chamber 4.

A system 43 of injection of acid gas in the chamber 2 is provided at a level of said chamber below the cellular wall and close to the chamber 3, said system being connected to the pipe 13 shunted on the pipe 10. Said system 43 can be of any type known that allows the making of a perfect mixture or the acid gas injected in the chamber 2 and the combustion fumes produced by the burner 6 in said chamber. Said system 43 can include, for example, a tubular ring 44 surrounding said chamber 2 and connected to the pipe 13 shunted on the pipe 10 and a plurality of tubular elements 45, shown here as being four, of which each one is connected by an end 46 to the ring 44 and penetrates the wall 33 of the chamber 2 to discharge in said chamber by its other end 47 tangentially or no to the wall of said chamber.

The process according to the invention is carried out as follows:

The gaseous or liquid combustible effluent is conveyed to the burner 6 by the pipe 7, while the appropriate amount of gas containing the free oxygen, which exceeds the theoretical amount for a complete combustion of combustible effluent, is conveyed by the pipe 8. The combustible mixture thus formed is burnt and the gases or fumes resulting from said combustion effected under oxidizing conditions meet the first current of acid gas consisting of the acid gas fraction derived from the acid gas current 10 by the conduit 13 and injected into the chamber 2 by the injection system 43. In contact with the oxidising fumes from the combustion, a part of the $H_2S$ of the said sour gas fraction is oxidised to $SO_2$ and sulphur and the traces of hydrocarbons which the said fraction may contain are completely destroyed, which consumes virtually all of the oxygen present in the said fumes. The gaseous products resulting from the abovementioned contact in the chamber 2 (first thermal reaction chamber) flow into the chamber 3 (second thermal reaction chamber) by passing through the orifice 33 whose geometry is chosen to promote the homogenisation of the said products, so as to permit the consumption of the oxygen which they contain. A second sour gas stream formed by the fraction of the sour gas stream which flows in the conduit 10 and is not branched off by the conduit 13 is delivered to the burner 9, while the required quantity of gas containing free oxygen, corresponding to obtaining an $H_2S:SO_2$ molar ratio which has the chosen value, generally equal or close to 2:1, in the gases originating from the catalytic reaction step, is delivered by the conduit 11, at a controlled flow rate, into the channel 40. The combustible mixture thus produced burns with a combustion temperature higher than 850° C. and more particularly higher than 920° C., this temperature being suitable for obtaining a stable flame at the exit of the burner 9 and for producing a complete combustion of the traces of hydrocarbons which may be present in the sour gas stream feeding the burner 9. The combustion gases produced by the burner 9 mix in the thermal reaction chamber 3 with the gaseous products originating from the chamber 2 to form a gas mixture containing $H_2S$, $SO_2$ and sulphur vapour, the said gas mixture being a reducing agent. This, when the fuel effluent, whose combustion is carried out with an excess of gas containing free oxygen in thermal reaction zone 2, contains sulphur compounds and ammonia or nitrogen compounds such as HCN, permits a total reduction of the nitrogen oxides and of the $SO_3$ which may have been formed during the combustion of the fuel effluent. The gas mixture produced in the thermal reaction chamber 3 passes through the refractory cellular wall 5, which further improves the quality of this mixture, and stays further in the high temperature residence chamber 4, in which the temperature is still higher than 900° C. The gas stream containing $H_2S$, $SO_2$ and sulphur vapour leaving the thermal reactor through the exit 42 of the latter, undergoes a first cooling in the heat recovery boiler 14 and is then cooled more intensely next in the condenser 17, in which a part of the sulphur present in the said gas stream condenses and can be removed by the conduit 18.

The gas stream originating from the condenser 17 then passes, after having been reheated, into the catalytic conversion stage 19 to convert into sulphur the quantities of $H_2S$ and $SO_2$ which it still contains. The gases originating from the catalytic conversion stage flow into the condenser 20 in order for the sulphur to separate out, and then into the incinerator 22 to convert the final traces of sulphur compounds into $SO_2$ before being discharged to the atmosphere through the stack 23. The $H_2S:SO_2$ molar ratio at the exit of the catalytic conversion stage is maintained at the chosen value, generally 2:1, by the action of the control means 24 actuating the servo mechanism 27 which adjusts the degree of opening of the valve 12 fitted in the conduit 11 for the delivery of gas containing free oxygen to the burner 9.

The said $H_2S:SO_2$ molar ratio could also be maintained at the chosen value by delivering to the burner 9, via a conduit which is not shown, a main flow of gas containing free oxygen proportional to the sour gas flow introduced into the said burner 9, by introducing by the conduit 11 an additional smaller flow of gas containing free oxygen and by controlling the said additional flow by adjusting the degree of opening of the valve 12 fitted in the conduit 11, by the action of the servo mechanism 27 actuated by the control means 24.

Three concrete examples of implementation of the process according to the invention are given below to supplement the description of the invention which has just been provided.

EXAMPLE 1

Sulphur production trials were carried out by simultaneously treating according to the invention an $H_2S$-lean sour gas and a gaseous fuel effluent consisting of a heating gas.

The sour gas contained, by volume, 25% of $H_2S_2$, 70.3% of $CO_2$, 4% of $H_2O$, 0.4% of $CH_2$, 0.2% of $C_2H_6$ and 0.1% of benzene, while the heating gas contained, by volume, 71.6% of methane, 10% of ethane, 4.6% of $C_3$ and higher alkanes, 0.5% of CO, 0.5% of $H_2$, 2.7% of nitrogen, 6.7% of $C_2H_4$, 1.8% of $CH_3SH$, 1% of $H_2S$ and 0.6% of $CO_2$.

The operation was carried out in a pilot plant similar to that described with reference to FIGS. 1, 2a and 2b, that is to say employing a thermal reactor comprising two thermal reaction chambers and a high temperature gas residence chamber. The gas containing free oxygen, employed to carry out the combustion of the gaseous fuel effluent and of a fraction of the sour gas, was air.

The gaseous fuel effluent, that is to say the heating gas, and the associated combustion air were delivered to the burner of the first thermal reaction chamber (chamber 2) at flow rates equal to 38.4 kilomoles/hour and 682 kilomoles/hour respectively and at temperatures of 58° C. and 100° C. respectively. The temperature in the first thermal reaction chamber in the vicinity of the burner 6 had a value of approximately 1500° C.

The combustion of the heating gas in the first thermal reaction chamber produced 723.7 kilomoles/hour of oxidising fumes containing, by volume, 73% of nitrogen, 13% of $H_2O$, 7.3% of oxygen, 6.6% of $CO_2$ and 0.1% of $SO_2$, and having a temperature of 1500° C.

The sour gas delivered by the conduit 10 at a temperature of 200° C. and at a flow rate of 1200 kilomoles/hour was divided, by an appropriate opening of the valve 28 controlled by a proportional metering device, into a first fraction flowing in the conduit 13 at a flow rate of 707.8 kilomoles/hour and a second fraction at a flow rate of 492.2 kilomoles/hour, used to feed the burner 9.

The said first fraction of sour gas was injected by the injection system 43 into the first thermal reaction chamber and mixed with the oxidising fumes produced in the said chamber by the combustion of the heating gas, carried out in excess air.

The gaseous products resulting from this mixing then flowed through the orifice 33 into the second thermal reaction chamber, the said products being at a temperature of 958° C. and containing, by volume, 4% of $H_2S$, 0.8% of $SO_2$, 3.5% of sulphur vapour, 36.2% of nitrogen, 34.5% of $CO_2$, 16.4% of $H_2O$, 3.2% of CO, 1% of $H_2$ and 0.4% of COS and $CS_2$.

The second fraction of sour gas was delivered to the burner 9 of the second thermal reaction chamber (chamber 3), the said burner also receiving 401 kilomoles/hour of air preheated to 200° C., this quantity of air resulting in an $H_2S:SO_2$ molar ratio of 2:1 being obtained in the gases originating from the catalytic reaction stage 19. The burner 9 produced 887 kilomoles/hour of combustion gases at a temperature of 925° C., the said combustion gases being free from hydrocarbons and containing, by volume, 4% of sulphur vapour, 2.2% of $H_2S$, 3.4% of $SO_2$, 38.1% of $CO_2$, 35% of nitrogen, 15.3% of $H_2O$, 1.4% of CO, 0.4% of $H_2$ and 0.2% of COS and $CS_2$.

The gases from combustion of the second fraction of sour gas, produced by the burner 9, mixed in the second thermal reaction chamber with the gaseous products reaching the said chamber through the orifice 33, originating from the first thermal reaction chamber. The resulting gas mixture, whose temperature was 950° C., passed through the cellular partition 5 into the gas residence chamber 4 and retained substantially the said temperature while staying in this chamber. The said gas mixture contained, by volume, 3.9% of sulphur vapour, 3.2% of $H_2S$, 1.6% of $SO_2$, 36% of $CO_2$, 35.8% of nitrogen, 16.1% of $H_2O$, 2.4% of CO, 0.7% of $H_2$ and 0.3% of COS and $CS_2$.

A hydrocarbon-free gas stream which had the temperature and the composition of the said gas mixture was removed through the exit 42 of the thermal reactor and was passed through the heat recovery boiler 14 at a flow rate of 2344 kilomoles/hour.

EXAMPLE 2

By operating in a plant similar to that employed for Example 1, sulphur production trials were carried out by simultaneously treating according to the invention a sour gas containing $H_2S$ and a liquid fuel effluent consisting of disulphides.

The sour gas contained, by volume, 35.3% of $H_2S$, 56.5% of $CO_2$, 7.2% of $H_2O$, 0.9% of $CH_4$ and 0.1% of $CH_3SH$, while the liquid fuel effluent consisted of a mixture containing, in molar percentages, 27% of dimethyl disulphide and 73% of diethyl disulphide.

The liquid fuel effluent and the associated combustion air were delivered to the burner of the first thermal reaction chamber at flow rates of 9.6 kilomoles/hour and 529.5 kilomoles/hour respectively and at temperatures of 38° C. and 100° C. respectively.

The temperature in the first thermal reaction chamber in the vicinity of the burner 6 was approximately 1540° C. The combustion of the liquid fuel effluent in the first thermal reaction chamber produced 550 kilomoles/hour of oxidising fumes containing, by volume, 74.3% of nitrogen, 9.7% of water, 6.5% of oxygen, 6% of $CO_2$ and 3.5% of $SO_2$.

The sour gas delivered by the conduit 10 at a temperature of 200° C. and a flow rate of 982 kilomoles/hour was divided, by appropriate opening of the valve 28 of the conduit 13, controlled by a proportional metering device, into a first fraction flowing in the said conduit 13 at a flow rate of 393.2 kilomoles/hour and a second fraction at a flow rate of 588.8 kilomoles/hour, used to feed the boiler 9 with which the second thermal reaction chamber is provided.

The said first fraction of sour gas was injected by the injection system 43 into the first thermal reaction chamber and mixed with the oxidising fumes produced in the said chamber by the combustion of the liquid fuel effluent carried out in excess air, which resulted in a complete destruction of the traces of hydrocarbon, namely $CH_4$, present in the said first fraction of sour gas.

The gaseous products resulting from this mixing then flowed through the orifice 33 into the second thermal reaction chamber, the said products being at a temperature of 1073° C. and containing, by volume, 5.3% of sulphur vapour, 3.5% of $H_2S$, 2% of $SO_2$, 42.3% of nitrogen, 23% of $CO_2$, 18.6% of $H_2O$, 3.6% of CO, 1.5% of $H_2$ and 0.2% of COS and $CS_2$.

The second fraction of sour gas was delivered to the burner 9 of the second thermal reaction chamber, the said burner also receiving 490 kilomoles/hour of air preheated to 200° C., this quantity of air resulting in an $H_2S:SO_2$ molar ratio of 2:1 being obtained in the gases originating from the catalytic reaction stage 19. The burner 9 produced combustion gases at a temperature of 925° C. and a flow rate of 1078 kilomoles/hour, the said combustion gases being free from hydrocarbons and containing, by volume, 6% of sulphur vapour, 4.8% of $H_2S_2$, 2.2% of $SO_2$, 35.1% of nitrogen, 29.7% of $CO_2$, 19.7% of $H_2O$, 1.5% of CO, 0.7% of $H_2$ and 0.3% of COS and $CS_2$.

The gases from combustion of the second fraction of sour gas, produced by the burner 9, mixed in the second thermal reaction chamber with the gaseous products reaching the said chamber through the orifice 33, originating from the first thermal reaction chamber. The resulting gaseous mixture, whose temperature was 996° C., passed through the cellular partition 5 into the gas residence chamber 4 and retained the said temperature while staying in this chamber. The said gaseous mixture contained, by volume, 5.7% of sulphur vapour, 4.2% of $H_2S$, 2.1% of $SO_2$, 38.4% of nitrogen, 26.6% of $CO_2$, 19.3% of $H_2O$, 2.4% of CO, 1% of $H_2$ and 0.3% of COS and $CS_2$.

A gas stream free from hydrocarbons and $SO_3$, which had the temperature and the composition of the above gas mixture was removed at a flow rate of 2046 kilomoles/hour through the exit 42 of the thermal reactor and was passed through the heat recovery boiler 14.

EXAMPLE 3

By operating in a plant similar to that employed for Example 1, sulphur production trials were carried out by simultaneously treating according to the invention a sour gas containing $H_2S$ and a gaseous fuel effluent containing ammonia, the said effluent resulting from the treatment of sour waters from refineries.

The sour gas contained, by volume, 90% of $H_2S$, 5.4% of $CO_2$, 4% of $H_2O$ and 0.6% of $CH_4$, while the gaseous fuel effluent consisted of a mixture containing, in molar percentages, 35% of $H_2S$, 35% of $NH_3$ and 30% of $H_2O$.

The gaseous fuel effluent and the associated combustion air were delivered to the burner of the first thermal reaction chamber at flow rates of 50.3 kilomoles/hour and 244.6 kilomoles/hour respectively and temperatures of 80° C. and 100° C. respectively.

The temperature in the first thermal reaction chamber in the vicinity of the burner 6 was 1500° C. The combustion of the gaseous fuel effluent in the first thermal reaction chamber produced 290.5 kilomoles/hour of oxidising fumes containing, by volume, 68.1% of nitrogen, 22% of $H_2O$, 6.1% of $SO_2$ and 3.8% of oxygen.

The sour gas delivered by the conduit 10 at a temperature of 50° C. and a flow rate of 100 kilomoles/hour was divided, by appropriate opening of the valve 28 of the conduit 13, controlled by a proportional metering device, into a first fraction flowing in the said conduit 13 at a flow rate of 67 kilomoles/hour and a second fraction at a flow rate of 33 kilomoles/hour, used to feed the burner 9 with which the second thermal reaction chamber is provided.

The said first fraction of sour gas was injected by the injection system 43 into the first thermal reaction chamber and mixed with the oxidising fumes produced in the said chamber by the combustion of the gaseous fuel effluent, carried out in excess air, which resulted in a complete destruction of the traces of hydrocarbon, namely $CH_4$, present in the said first fraction of sour gas.

The gaseous products resulting from this mixture then flowed through the orifice 33 into the second thermal reaction chamber, the said products being at a temperature of 1326° C. and containing, by volume, 6.9% of sulphur vapour, 3.6% of $H_2S$, 3.6% of $SO_2$, 53.7% of nitrogen, 26.5% of $H_2O$, 4.6% of $H_2$, 0.7% of $CO_2$ and 0.4% of CO.

The second fraction of sour gas was delivered to the burner 9 of the second thermal reaction chamber, the said burner also receiving 34 kilomoles/hour of air preheated to 100° C., this quantity of air resulting in an $H_2S:SO_2$ molar ratio of 2:1 being obtained in the gases originating from the catalytic reaction stage 19. The burner 9, whose flame temperature was 929° C., produced 67.8 kilomoles/hour of combustion gases, the said gases being free from hydrocarbons and containing, by volume, 10.7% of sulphur vapour, 22% of $H_2S$, 0.3% of $SO_2$, 38.8% of nitrogen, 22.8% of $H_2O$, 2.5% of $H_2$, 2.5% of $CO_2$ and 0.4% of CO.

The combustion gases from the second fraction of sour gas, produced by the burner 9, mixed in the second thermal reaction chamber with the gaseous products reaching the said chamber through the orifice 33, originating from the first thermal reaction chamber. The resulting gas mixture, whose temperature was 1253° C., flowed through the cellular partition 5 into the gas residence chamber 4 and retained the said temperature while staying in this chamber.

The said gas mixture contained, by volume, 8.4% of sulphur vapour, 5.2% of $H_2S$, 2.6% of $SO_2$, 51.2% of nitrogen, 26.9% of $H_2O$, 4.4% of $H_2$, 0.9% of $CO_2$ and 0.4% of CO.

A gas stream free from hydrocarbons, $SO_3$ and nitrogen oxides and having the temperature and the composition of the above gas mixture was removed at a flow rate of 438 kilomoles/hour through the exit 42 of the thermal reactor and was passed through the heat recovery boiler 14.

We claim:

1. A process for the production of sulphur from at least one sour gas containing $H_2S$ and a gaseous or liquid fuel effluent, which comprises:

(i) a thermal reaction step carried out in a thermal reaction stage and consisting of carrying out a controlled oxidation of the $H_2S$ in the sour gas and a complete combustion of the fuel effluent to produce a gas stream containing $H_2S$, $SO_2$ and sulphur vapor;

(ii) a step of indirect cooling of said gas stream to separate the sulphur therefrom by condensation, and next (iii) a catalytic reaction step carried out on the gas stream originating from the indirect cooling step;

and wherein the thermal reaction step comprises:

(a) performing the combustion of the gaseous or liquid fuel effluent containing sulfur compounds capable of being oxidized into $SO_2$ and optionally $NH_3$ or HCN in a first zone of the thermal reaction stage with a quantity of a gas containing free oxygen in excess in relation to the theoretical quantity needed for a complete combustion of the fuel effluent, the said excess being smaller than the theoretical proportion of gas containing free oxygen needed to oxidize to $SO_2$ approximately one third of the $H_2S$ of the total flow of sour gas to be treated;

(b) injecting a first stream of sour gas comprising $H_2S$ and containing hydrocarbons into the combustion fumes comprising $SO_2$ of the fuel effluent which are present in the said first zone of the thermal reaction stage;

(c) burning incompletely a second stream of said sour gas comprising $H_2S$ and hydrocarbons in a second zone of the thermal reaction stage, which receives the gaseous products from the first zone, with a controlled quantity of gas containing free oxygen supplied from outside the thermal reaction stage, such that the gases originating from the catalytic reaction step contain $H_2S$ and $SO_2$ in a $H_2S:SO_2$ molar ratio of approximately 2:1; and (d) adjusting the flow rates of the first and second sour gas streams so that the temperature obtained during the incomplete combustion of the second sour gas stream in the second zone of the thermal reaction stage has a value nigher than 850° C.

2. Process according to claim 1, wherein the adjustment of the flow rates of the first and second sour gas streams is such that the temperature obtained during the incomplete combustion of the second sour gas stream in the second zone of the thermal reaction stage has a value higher than 920° C.

3. Process according to claim 1 wherein the gas stream originating from the second zone of the thermal reaction stage passes through a gas residence zone in which the said gas stream is maintained at a temperature equal to its exit temperature from the said second zone.

4. Process according to claim 1 wherein the first stream and/or second stream of sour gas contain hydrocarbons in an overall concentration by volume of between 0.2 and 10%.

5. Process according to claim 1 wherein the first and second sour gas streams consist of two different sour gases which have identical or different $H_2S$ contents.

6. Process according to claim 5, wherein the first sour gas stream has an $H_2S$ content lower than that of the second sour gas stream.

7. Process according to claim 1 wherein the first and second sour gas streams consist, respectively, of a first fraction of a single sour gas and of the remaining fraction of this single sour gas.

8. Process according to claim 1 wherein the second sour gas stream has an $H_2S$ content higher than 15% by volume, in that the flow rate of the fuel effluent and the overall flow rate of the first and second sour gas streams are such that the molar flow rate X of the $SO_2$ formed during the combustion of the fuel effluent is lower than half of the total molar flow rate Y of the $H_2S$ delivered by the said sour gas streams and in that the excess of gas containing free oxygen corresponds to a molar oxygen flow rate lower than $(Y-2X)/2$, in relation to the theoretical quantity needed for a complete combustion of the fuel effluent.

9. Process according to claim 1 characterised in that, while the first and second sour gas streams have an $H_2S$ content lower than 35% by volume.

10. Process according to claim 1 wherein the gas stream originating from the second zone of the thermal reaction stage passes through a gas residence zone in which the said gas stream is maintained at a temperature close to its exit temperature from the said second zone.

11. Process according to claim 1 wherein the first stream and/or second stream of sour gas contain hydrocarbons in an overall concentration by volume of between 0.5 and 5%.

12. A process for the production of sulphur from at least one sour gas containing $H_2S$ and a gaseous or liquid fuel effluent, which comprises:
   (i) a thermal reaction step carried out in a thermal reaction stage and consisting of carrying out a controlled oxidation of the $H_2S$ in the sour gas and a complete combustion of the fuel effluent to produce a gas stream containing $H_2S$, $SO_2$ and sulphur vapor;
   (ii) a step of indirect cooling of said gas stream to separate the sulphur therefrom by condensation, and next
   (iii) a catalytic reaction step carried out on the gas stream originating from the indirect cooling step, and wherein the $H_2S$:$SO_2$ molar ratio of the gases from the catalytic reaction step is equal to approximately 2:1; and wherein the thermal reaction step comprises:

(a) performing the combustion of the gaseous or liquid fuel effluent comprising sulfur compounds capable of being oxidized into $SO_2$ and optionally $NH_3$ or HCN in a first zone of the thermal reaction stage with a quantity of a gas containing free oxygen in excess in relation to the theoretical quantity needed for a complete combustion of the fuel effluent, the said excess being smaller than the theoretical proportion of gas containing tree oxygen needed to oxidize to $SO_2$ approximately one third of the $H_2S$ of the total flow of sour gas to be treated;

(b) injecting a first stream of sour gas containing hydrocarbons in a concentration by volume of between 0.2 and 10% and $H_2S$ into the combustion fumes comprising $SO_2$ of the fuel effluent which are present in the said first zone of the thermal reaction stage;

(c) burning incompletely a second stream of sour gas containing hydrocarbons in a concentration by volume of 0.2 and 10% and $H_2S$ in a second zone of the thermal reaction stage, which receives the gaseous products from the first zone, with gas containing free oxygen supplied from outside the thermal reaction stage; and (d) adjusting the flow rates of the first and second sour gas streams and the gas containing oxygen so that the temperature obtained during the incomplete combustion of the second sour gas stream in the second zone of the thermal reaction stage has a value higher than 850° C. and the $H_2S$:$SO_2$ mole ratio is approximately 2:1.

* * * * *